July 21, 1953

J. H. LONG 2,646,469

BALANCED MULTICHANNEL AMPLIFIER
FOR WIDE AMPLITUDE RANGE

Original Filed March 6, 1946

INVENTOR

JOHN H. LONG

BY

ATTORNEY

July 21, 1953
J. H. LONG
2,646,469
BALANCED MULTICHANNEL AMPLIFIER
FOR WIDE AMPLITUDE RANGE
Original Filed March 6, 1946
6 Sheets-Sheet 2
FIG. 4.
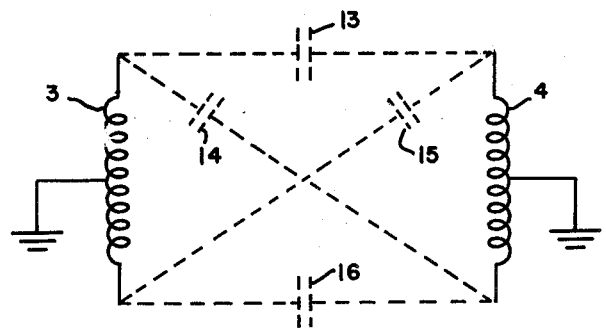
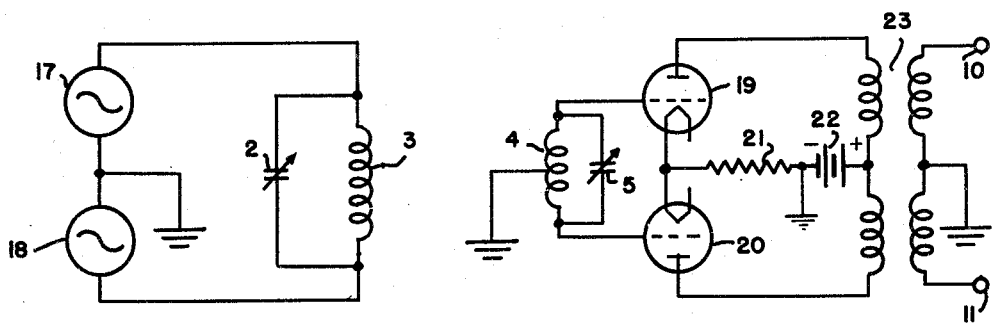
FIG. 5.
*INVENTOR*
JOHN H. LONG
BY
*ATTORNEY*

July 21, 1953     J. H. LONG     2,646,469
BALANCED MULTICHANNEL AMPLIFIER
FOR WIDE AMPLITUDE RANGE
Original Filed March 6, 1946     6 Sheets-Sheet 3
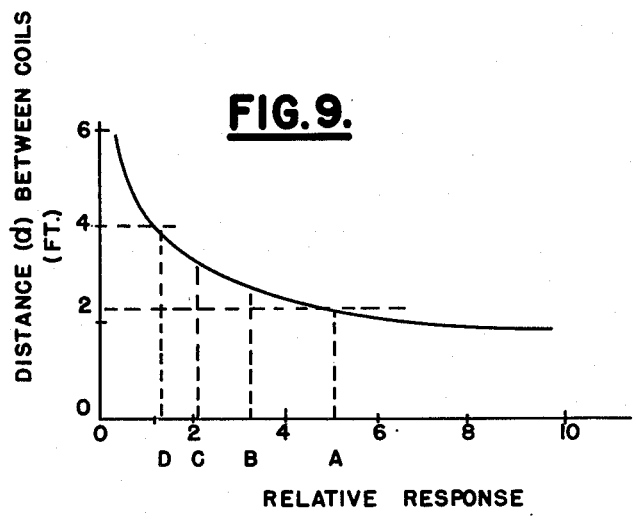
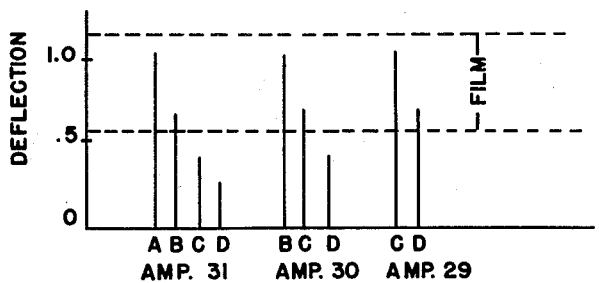
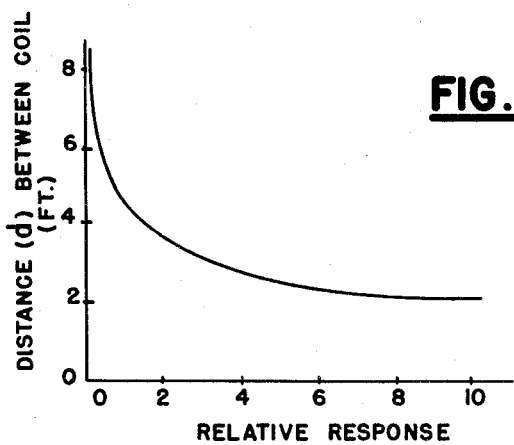
INVENTOR
JOHN H. LONG
BY
ATTORNEY July 21, 1953   J. H. LONG   2,646,469
BALANCED MULTICHANNEL AMPLIFIER
FOR WIDE AMPLITUDE RANGE
Original Filed March 6, 1946   6 Sheets-Sheet 4

INVENTOR

JOHN H. LONG

BY *A. H. Helmerston*

ATTORNEY

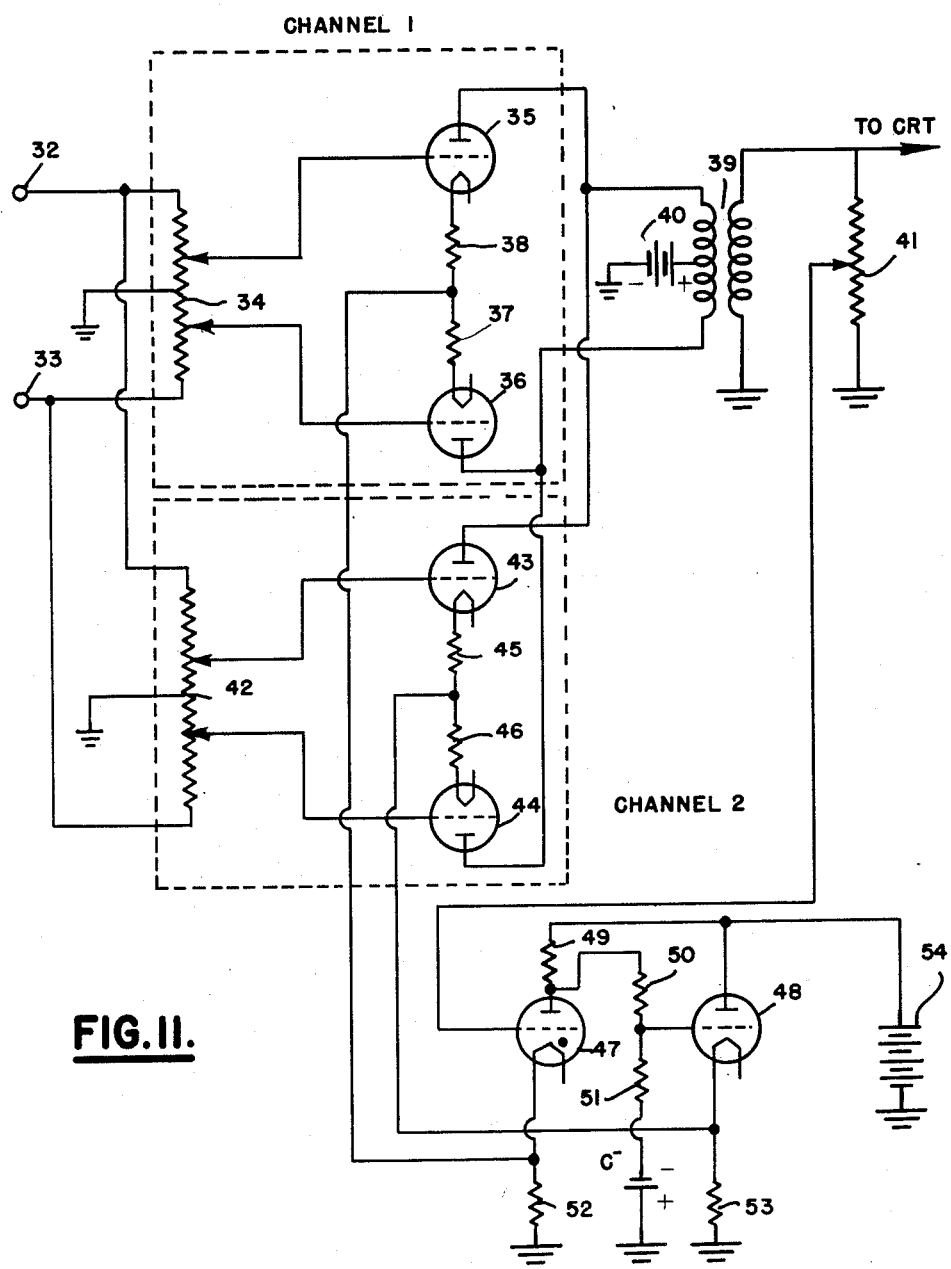
FIG. II.

INVENTOR
JOHN H. LONG
BY *A.H.Helmstein*
ATTORNEY

Patented July 21, 1953

2,646,469

UNITED STATES PATENT OFFICE 2,646,469

BALANCED MULTICHANNEL AMPLIFIER FOR WIDE AMPLITUDE RANGE

John H. Long, Flushing, N. Y., assignor to the United States of America as represented by the Secretary of the Navy Original application March 6, 1946, Serial No. 652,909. Divided and this application February 21, 1950, Serial No. 145,336

4 Claims. (Cl. 179—171)

My invention relates to measuring systems and more particularly to accurately and instantaneously indicating and recording the relative displacement between two objects.

The present case is a divisional application of Serial No. 652,909, filed March 8, 1946, now Patent No. 2,538,158, issued January 16, 1951.

In determining the effect of shock, vibration, etc., on equipment subject thereto, it is necessary to have a record of the instantaneous relative position of portions of the equipment. From this record, it is not only possible to ascertain the maximum deflections of the various components of the apparatus but also to determine velocity, acceleration, rate of change of acceleration, etc. From these data, the effect of the disturbance can be evaluated and design changes made accordingly.

It is possible that the distance between two objects may be determined by the use of a magnetic system comprising an exciting coil mounted on one object and excited with a relatively high frequency electric current and a pick-up coil mounted on the other object adapted to respond to the magnetic field produced by current flow in the first coil. Inasmuch as the strength of the magnetic field and hence the induced voltage in the pick-up coil is dependent on the distance from the exciting coil, the induced voltage is a measure of displacement. As the frequency of excitation may be very high, the induced voltage is a practically instantaneous measure of the distance between the two coils and therefore of the relative position of the two objects subjected to the shock, vibration, or other disturbance. A record of this voltage therefore provides the desired record of relative displacement.

As a means of measuring displacement, the above-mentioned arrangement has several disadvantages. One of these is the capacitive coupling between the two coils. This coupling, due to capacitance between the turns of the coils, between the coils and intermediate objects, and between coils and the power supply leads, introduces a disturbing factor in the calibration of the system and prevents obtaining an accurate record of displacement since the capacitance may be due to changes other than relative displacement.

A second disadvantage of the above measuring systems is the inability of these systems to provide an accurate permanent record of the relative displacement between the two objects. This inability arises from the fact that the induced voltage in the pick-up coil generally changes over an extremely wide range even though the motion of the two coils is small. Hence, under a particular condition of motion, these devices require that an estimate be made of the total displacement to be expected and the scale of the recording equipment set so that a record will always remain in the recording film. This method not only requires a preliminary estimate of the total expected deflection but also obtains a complete record only at the expense of inaccuracy in the lower portions of the range. While this difficulty can be avoided by the use of large record film, the expense and size of this procedure is undesirable.

In accordance with my invention, the above mentioned disadvantages of these magnetic displacement measuring devices are obviated by the use of a balanced exciting and pick-up system, together with a recording system having an automatic scale change.

Use of a balanced excitation system, and pick-up coil, together with a balanced amplifying and recording system, causes the various electrostatic capacitances between the excitation system and the recorder to be neutralized. This prevents the effects of capacitive coupling and renders the entire system independent of changes which alter stray capacitances. In particular, intermediate objects between the pick-up and excitation coil, power supply leads, and other sources of stray capacity may move without producing a changed indication on the recording system.

In accordance with a further aspect of this invention, the accuracy of a distance recording system is improved without the use of a large film size by automatically and instantaneously changing the scale of the recording in accordance with the voltage at the pick-up coil. When this voltage causes the recording to exceed the available film width with the particular amplification in operation, the amplification is automatically decreased in definite steps of known and predetermined size, thereby limiting the record to the available film width and rendering the measurement quantitative for all ranges of amplification, the amplification being known and fixed in each of the several steps, and the particular step employed being readily determinable by inspection of the record, where changes of amplification appear as sudden discontinuities in the trace.

Also in accordance with my invention, the instantaneous change in calibration is achieved by firing a gas discharge tube as the signal to be recorded reaches the limits of the recording film. By causing conduction of the gas discharge tube to prevent operation of an amplifier having a high degree of amplification and simultaneously causing operation of an amplifier having a lower degree of amplification, this change in scale is achieved.

My invention further resides in increasing the effective recording film width to any desired degree by combining separate scale changing systems to act successively as the pick-up coil voltage progressively increases.

My invention further resides in features of construction, combination, and arrangement herein described or disclosed whereby an image is presented on a cathode ray tube representative of the displacement between the two objects in a form suitable for visual observation or recording on a permanent film and in a manner giving instantaneous response.

While the invention is susceptible of various modifications and alternative constructions, I have shown in the drawings and will herein describe in detail the preferred embodiment. It is to be understood, however, that I do not intend to limit the invention by such disclosures for I aim to cover all modifications and alternative constructions falling within the spirit and scope of the invention as defined in the appended claims.

In the drawings:

Figure 4 shows the equivalent electrostatic capacitances of the system in Figure 3.

Figure 5 shows an alternate method whereby the operation of a magnetic distance measuring system may be balanced with respect to capacity couplings.

Figure 6 shows the response of a system such as that of Figure 5.

Figure 9 shows how the response curve of the magnetic distance recording system is divided for an automatic scale change.

Figure 10 shows how displacements appear on the film of Figure 7.

Figure 11 shows a schematic circuit of a two-scale automatic system.

Figure 1:
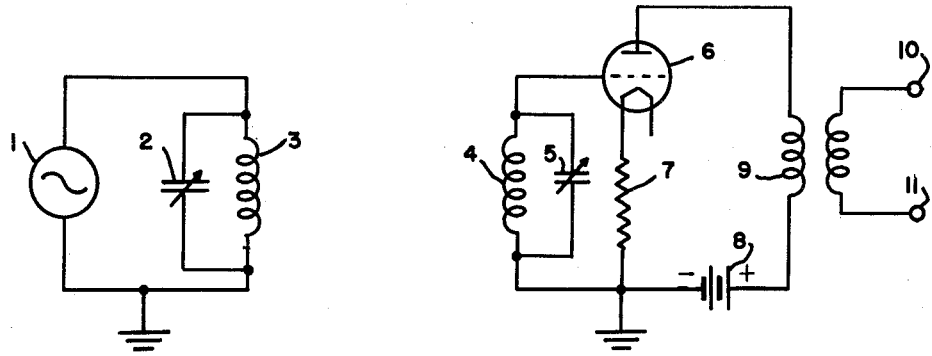
Figure 1 shows a simple diagram of an elementary system for magnetically determining the distance between two objects.

Referring now to Figure 1, generator 1, coil 3, and condenser 2 comprise the exciting system for a magnetic distance measuring device. Coil 3 is caused to resonate at the frequency of generator 1, preferably 10,000 cycles by the use of shunt condenser 2. This reduces the magnitude of the current required from generator 1 to achieve a particular value of magnetic flux within coil 3 and induced voltage in the pick-up coil. The pick-up system comprises coil 4, condenser 5, tube 6, output transformer 9, resistance 7 and battery 8. Condenser 5 tunes coil 4 to resonance at the frequency of generator 1, thereby producing a maximum voltage at the grid of tube 6 for a particular value of distance between coils 3 and 4. Resistance 7 provides grid bias for tube 6 and battery 8 supplies plate supply potential. Output voltage is taken across terminals 10 and 11 of output transformer 9.

Figure 2:
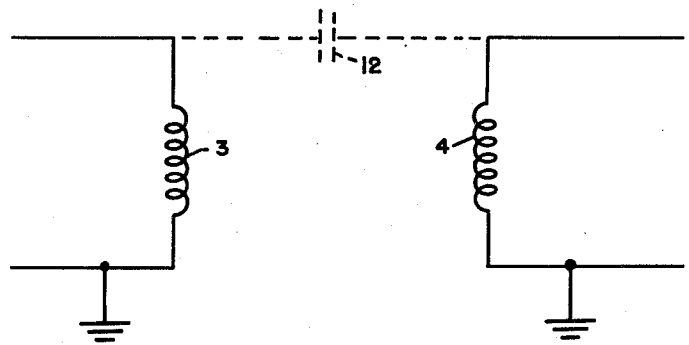
Figure 2 shows how electrostatic capacitance influences the operation of the system shown in Figure 1.

A voltage appearing at the grid of tube 6 comprises two components, one component due to induced voltage in coil 4 due to magnetic flux from exciting coil 3. The second component comprises a voltage at the grid of tube 6 due to electrostatic capacitance between the circuit of the excitation system and tube 6. Figure 2 shows the nature of this capacitance. In the figure, condenser 12 represents the weighted value of capacitance between coils 3 and 4 due to the distributed capacitance between the turns of coil 3 and the turns of coil 4 and to intermediate objects having capacitance to both coils. This condenser is in effect a coupling condenser between the circuit of generator 1 and the circuit of tube 6 and accordingly produces a component in the output voltage at terminals 10 and 11.

Since the capacitance 12 includes in part stray capacitance between the two coils caused by external objects, movement of these objects relative to the coils influences the value of the pick-up voltage. Hence the output voltage at terminals 10 and 11, Figure 1, not only indicates the relative position of coils 3 and 4 but also the position of other objects which are not intended to influence the results. It is for this reason that the magnetic distance recording system shown in Figure 1 is unsatisfactory in operation except under conditions wherein the electrostatic capacitance between the exciting and pickup systems is negligible.

Figure 3:
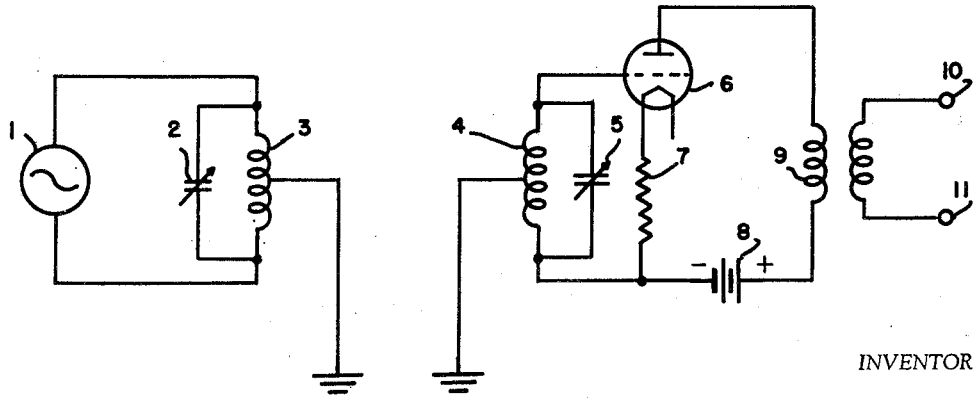
Figure 3 shows a circuit similar to that of Figure 1 but adapted for balanced operation of the excitation and pick-up coils.

Figure 3 shows a balanced system wherein electrostatic capacitance between coils 3 and 4, due to direct capacitance or due to the presence of adjacent objects, is neutralized. In this circuit, the center taps of coils 3 and 4 are grounded instead of one end as shown in Figure 1. In this case, an equivalent circuit showing the electrostatic capacitance between the grid circuit of tube 6 and the exciting circuit is as shown in Figure 4. On the grid side of coil 4, two capacitance components exist, the first, 13, is between the grid end of coil 4 and one end of coil 3 whereas the other, 15 is between the grid end of coil 4 and the opposite end of coil 3. Similarly, the cathode end of coil 4 is coupled by capacitances 14 and 16 to the opposite ends of coil 3. Inasmuch as the voltages appearing at the opposite ends of coil 3 are 180° out of phase and capacitances 13 and 15 and 14 and 16 are nearly identical, the value of induced voltage in the grid circuit of tube 6 due to electrostatic capacitance is negligible and the output voltage at terminals 10 and 11 is not influenced by this capacity.

Figure 5 shows an alternate method whereby balanced operation of a magnetic distance measuring system may be secured. In the figure, the generator 1 of Figure 1 is replaced by two generators 17 and 18 having a grounded common terminal and producing equal voltages having a 180° phase relation. This may be accomplished by the use of a conventional push-pull oscillator circuit or by a balancing circuit connected to a single ended oscillator. In either case and in the showing of Figure 3, excitation of the exciting coil 3 is equal and opposite at the two ends thereof, or about the electrical impedance center of the coil. Coil 4 is likewise excited symmetrically about its impedance or electrical center. In addition to this modification, Figure 5 illustrates the use of a push-pull amplifier circuit attached to coil 4. In this case the grid circuits of tubes 19 and 20 are connected to opposite ends of coil 4 and a push-pull output transformer 23 is used. Plate supply voltage for tubes 19 and 20 is supplied from battery 22 and grid bias supplied from resistance 21. This push-pull circuit has the advantages of being balanced throughout with respect to ground so that leads to filament circuit, plate voltage supply circuit etc., produce no unbalanced capacities to the exciting system which may influence the results.

Figure 6 shows a response curve typical of that obtained from a system such as shown in Figure 5. The figure shows the relative response which may be obtained in an impedance connected across terminals 10 and 11 or voltage at these terminals for various values of distance between the two coils. It is evident from the curve that a relatively great change in distance when the coils are separated produces the same change in response as a relatively small change in distance when the coils are close together. Hence to achieve a particular accuracy in measuring the distance between the coils, it is necessary to have an extremely accurate measurement of current at the low value of current as compared with the accuracy of measurement at relatively high values of current. For this reason, conventional recording systems will not provide satisfactory operation with a system such as that of Figure 5.

Figure 7:
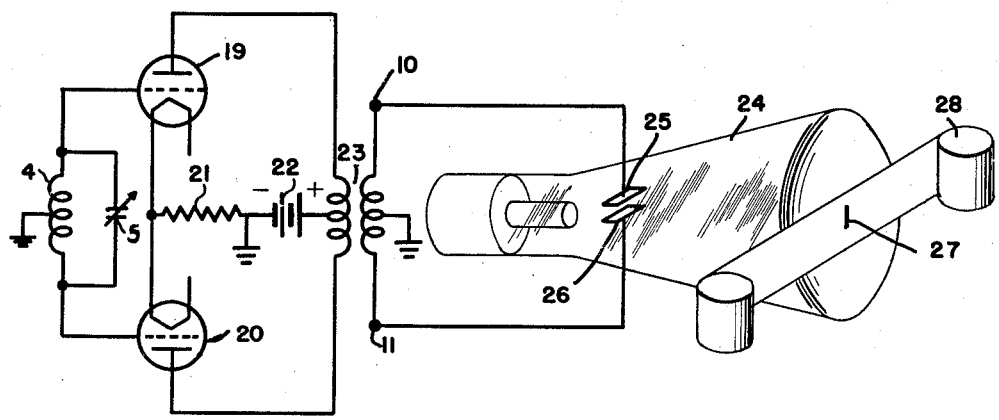
Figure 7 shows a partially schematic and partially isometric view of a recording system adapted for use with a magnetic distance measuring system.

A recording system adapted for use in connection with a system such as that of Figure 5 is shown in Figure 7. In the figure, 24 is a cathode ray tube having horizontal deflection plates 25 and 26 connected to output terminals 10 and 11. Signals from generating coil 3 are impressed on pick-up coil 4 and appear as an alternating voltage across deflection plates 25 and 26, thereby causing a vertical motion of the cathode ray tube beam in accordance with the magnitude of the induced voltage. Since the beam has no horizontal motion across the screen, the image appears as a line as shown at 27. By providing film 28 moving at a rapid rate across the image 27, a record is obtained of the changes in magnitude of this image.

With a film 28 of reasonable dimensions, it is not possible to obtain an accurate record of displacement between coils 3 and 4 if any reasonably large change in displacement takes place. The cause of this is evident from examination of Figure 6. Suppose, for instance, the distance between the coils changes from 8 feet to 2 feet at a uniform rate. In this case, the change from 8 feet to 6 feet will cause a change in output signal 27 of .1 to .4 unit, a change of .3 unit. On the other hand, the change from 4 feet to 2 feet involves a change of 1.2 to 10 units, a total difference of 8.8 units, almost 30 times as great. It is, therefore, necessary to measure displacement in part of the scale range to an accuracy 30 times as great as the rest of the range.

Figure 8:
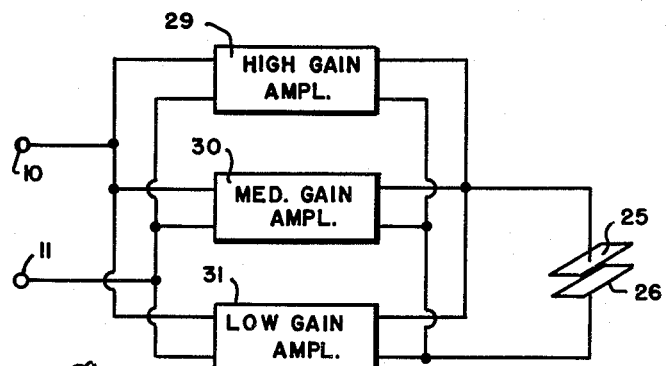
Figure 8 shows in block form how I accomplish an automatic scale change of the recording system.

I have found that the need for a large film 28 may be avoided by an automatic switching system adapted to change the scale of image 27 progressively in accordance with the value of the voltage at terminals 10 and 11. This system is shown in block form in Figure 8. Attached to terminals 10 and 11 are a number of amplifiers, such as the three amplifiers 29, 30 and 31. The output of these amplifiers is connected directly to cathode ray tube deflection plates 25 and 26. Amplifier 29, for instance, is adapted to operate with a high degree of amplification so that when low values of input signals appear across terminals 10 and 11, a relatively large deflection of the cathode ray tube beam is obtained if this amplifier is operating. Amplifier 30, for instance, is adapted to produce an intermediate amount of amplification so that the deflection of the cathode ray tube beam is somewhat smaller for the same signals at terminals 10 and 11 than is the case of amplifier 29. Similarly, amplifier 31 is of even lower amplification so that the three amplifiers together provide a large range of successive amplification and permit readable signals on the recording film over a very large range in voltage appearing across points 10 and 11. In addition to providing amplifiers 29, 30, and 31 with different values of amplification, I provide a progressive automatic switching system whereby only amplifier 29 is caused to be operative when signals within its most effective range are received, and amplifier 31 operates when signals within its most effective range are received. Hence, the system automatically adjusts itself to provide output signals within the scale range of film 28, Figure 7, even though the variation in voltage at terminals 10 and 11 is extremely large.

Now referring to Figure 9, the method of establishing the amplifier ranges is shown in detail. Suppose, for instance, the distance between the pick-up coils and the transmitting coils varies from 2.5 feet to 4 feet and it is desired to cause the system to record the variation in voltage output in three progressive stages having equal percentage accuracy. To do this, I set amplifier 29 to operate between output signals D and C, Figure 9; amplifier 30 to operate between output signals C and B, Figure 9; and amplifier 31 to operate between output signals B and A, Figure 9. These four values of output signal setting are arranged in geometric series relationship so that the same ratio exists between C and D, B and C, and A and B.

Figure 10 shows in detail the appearance on the recording film of various signals corresponding to the limits of operation of the three amplifiers and with the three amplifiers in operation. From the figure, it is evident that with amplifier 31 in operation (low amplification) signals A and B appear within the range of the recording film, but that signals C and D are too small to appear thereon. On the other hand, with amplifier 30 in operation (intermediate amplification) signals B and C appear on the film but signal D is too small to appear on the film and signal A is too large. If amplifier 29 is operating (maximum amplification) signals C and D appear on the film but signals A and B extend completely across it and do not result in any usable indication.

Figure 11 shows a circuit diagram of a two channel amplifier adapted for automatic switching in accordance with my invention. In the figure, terminals 32 and 33 comprise input terminals which would ordinarily be connected to terminals such as 10 and 11, Figure 7. Potentiometer 34 is connected to terminals 32 and 33 and supplies grid voltage to tubes 35 and 36. Cathode bias for these tubes is supplied by resistances 37 and 38, together with resistance 52. Plate supply voltage for these tubes is supplied through battery 40 and the primary winding of output transformer 39. The second channel comprises tubes 43 and 44 fed from terminals 32 and 33 by potentiometer 42. Cathode resistances 45 and 46, together with resistance 53, provide cathode bias for this channel. Plate supply voltage is derived from battery 40 in the same manner as in the case of tubes 35 and 36. Output signals from both channels are applied to transformer 39 having its secondary connected to the deflection plates of a cathode ray tube.

In order to automatically switch from channel 1, Figure 11, to channel 2, the tubes 47 and 48 and the associated circuits are provided. Tube 47 is a gas discharge tube having its cathode circuit connected by resistance 52 to ground and its grid connected by potentiometer 41 to the output voltage of transformer 39. Plate supply voltage for tube 47 is supplied from battery 54 and resistance 49. Tube 48 is a vacuum tube having its grid connected by the resistances 50 and 51 into the plate circuit of tube 47 and its cathode connected by resistance 53 to ground. Plate supply voltage for tube 48 is supplied directly from battery 54. The cathode of tube 47 is connected to the cathodes of tubes 35 and 36 by resistances 38 and 37 whereas the cathode of tube 48 is connected by resistances 45 and 46 to the cathodes of tubes 43 and 44.

Operation of the circuit of Figure 11 is as follows. When output voltage across transformer 39 is below a predetermined level established by the characteristics of tube 47, the setting of potentiometer 41, and the value of voltage of battery 54, tube 47 never reaches the firing point. Hence, no plate current passes through the tube 47 and the grid of tube 48 is at a high positive potential determined by battery 54 and resistors 49, 50 and 51. Hence, tube 48 draws a high space current, resulting in a large value of voltage drop across resistance 53 which in turn biases tubes 43 and 44 beyond the cut-off point and prevents operation of channel 2. Inasmuch as no space current passes through tube 47, the voltage drop across resistance 52 is only that due to operation of tubes 35 and 36 and amplifier channel 1 operates in the normal manner. Hence, so long as the output voltage of transformer 39 is below the predetermined level, only channel 1 is operative and the deflection of the cathode ray tube beam corresponds to the amplification in this channel.

When the output voltage appearing across transformer 39 exceeds the value required to fire gas discharge tube 47, space current flows therethrough. This current causes a voltage drop across resistance 52, thereby biasing tubes 35 and 36 beyond the cut-off point and preventing operation of the amplifier channel 1 associated with these tubes. In addition, the space current flow through tube 47 causes a voltage drop in resistance 49 which reduces the grid voltage at tube 48 thereby reducing space current flow therethrough to the point at which negligible voltage drop is produced in resistance 53. Hence, amplifier channel 2 is operative and a deflection at the cathode ray tube corresponding to the amplification of this channel is obtained. By properly setting the values of potentiometer 34 and 42, together with potentiometer 41 and the characteristics of the circuit of tube 47, the range of the two channels is established to divide the the range of the output voltages in a manner providing maximum optimum performance. Inasmuch as the circuit is instantaneous in operation, the change is completely automatic and I obtain a useful record over the entire range of input signals.

Figure 12:
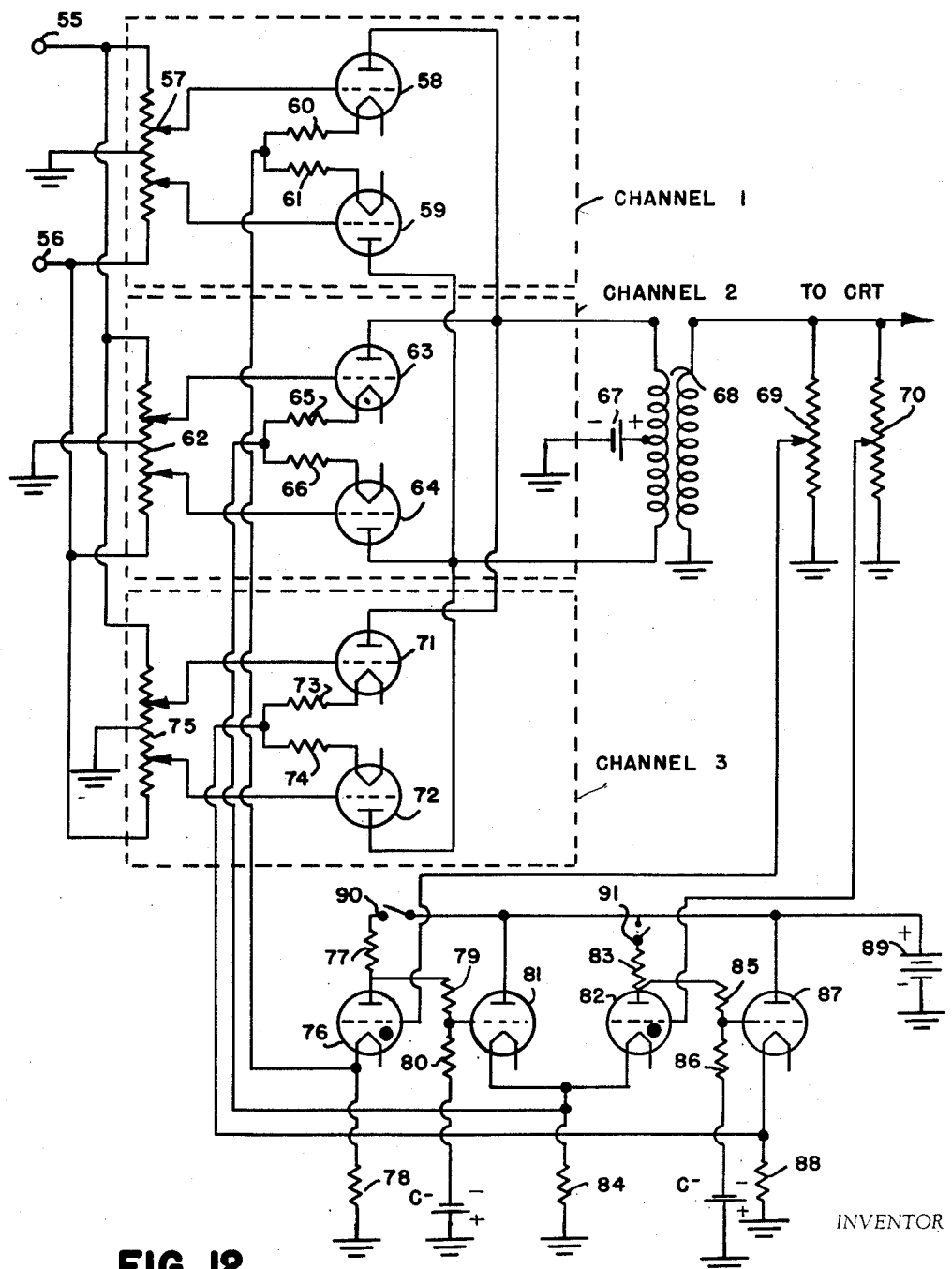
Figure 12 shows a schematic circuit diagram of an automatic system adapted to change the scale range automatically over three different scales.

Figure 12 shows a schematic circuit diagram of a system utilizing three amplifier channels having automatic switching circuits which provide progressive operation in accordance with increasing signal level. In the figure, input signals are supplied to terminals 55 and 56 which in turn are connected to potentiometers 57, 62 and 75 leading to the three separate amplifier channels. Tubes 58 and 59 comprise the first amplifier channel. The control grids of these tubes are connected to potentiometer 57 and the cathodes to bias resistances 60, 61 and 78. Tubes 63 and 64 comprise the second amplifier channel, being connected to potentiometer 62 and cathode resistances 65, 66 and 84. Tubes 71 and 72 comprise the third amplifier channel. The control grids of these tubes are connected to potentiometer 75 and the cathodes to resistances 73, 74 and 88. Output transformer 68, together with plate supply source 67, is connected to all three amplifier channels. The secondary of output transformer 68 leads to the cathode ray tube deflecting circuit and to potentiometers 69 and 70. The automatic selection system comprises tubes 76, 81, 82 and 87 and their associated circuits. Tubes 76 and 82 are gas discharge tubes having their grids connected to potentiometers 69 and 70. The plate of tube 76 is connected through resistance 77 and switch 90 to plate supply voltage source 89. The grid of tube 81 is connected by resistances 79 and 80 to the plate of tube 76. The plate of tube 81 is connected directly to the plate supply voltage source 89. The cathodes of tubes 81 and 82 are connected to common cathode bias resistance 84. The anode of tube 82 is connected by resistance 83 and switch 91 to plate supply voltage 89. The grid of tube 87 is connected by resistances 85 and 86 to the plate circuit of tube 82.

Operation of the system shown in Figure 12 is as follows. With switches 90 and 91 closed and gas discharge tubes 76 and 82 in the non-conducting condition, input signals at terminals 55 and 56 below a predetermined level will not cause a sufficient voltage to appear at tube 76 to cause it to conduct. Hence, no space current due to tube 76 passes through resistance 78 and the operation of the channel comprising tubes 58 and 59 is normal. Inasmuch as the grid of tube 81 is provided with a high positive potential by reason of the circuit comprising resistances 77, 79 and 80, a large space current flows through this tube, thereby causing a high voltage drop in resistance 84 which cuts off plate current flow in tubes 63 and 64 and prevents operation of the amplifier channel No. 2. Similarly, tube 87 draws a high value of plate current, thereby preventing operation of tubes 71 and 72 and channel No. 3. When the output voltage of transformer 68 reaches a predetermined value, tube 76 fires, thereby causing plate current flow through resistance 78 and biasing tubes 58 and 59 beyond the cut-off point. Operation of channel No. 1 is thereby prevented. The voltage drop in resistance 77 reduces the grid voltage at tube 81 below the cut-off point, thereby reducing the voltage drop in resistance 84 to the point at which amplifier channel No. 2 (tubes 63 and 64) is operative. If the voltage appearing at terminals 55 and 56 further increases to the point at which output voltage from transformer 68 is sufficient to fire tube 82, plate current flow takes place through this tube, thereby causing voltage drop in resistance 84 sufficient to bias tubes 63 and 64 to the cut-off point and preventing operation of channel No. 2 of the amplifier. However, the voltage drop in resistance 83 is sufficient to cause decreased plate current flow in tube 87 and reduce the bias of tubes 71 and 72 below the cutoff point. Operation of channel No. 3 is then possible. Hence, the three amplifiers are automatically switched to change the scale range of the cathode ray tube in accordance with the variation in input voltage at terminals 55 and 56, the changes taking place when the input signals reach predetermined levels.

Adjustment of the amplifiers in Figure 12 is obtained by changing the resistance values at potentiometers 57, 62 and 75. These are adjusted until the overall amplification of the three amplifiers is such as to provide overall amplification values as shown in Figure 10. The transition from one amplifier to the next is controlled by the setting of potentiometers 69 and 70, together with the characteristics of tubes 82 and 76 and the value of voltage source 89, the settings of said potentiometers being such that gas discharge tube 76 is fired at a slightly lower output potential than the output potential at which gas discharge tube 82 is fired. These values I adjust so that the transition occurs at voltage values B and C, Figure 9. Hence, as the output voltage changes from point D, Figure 9 through points C and B to A, Figure 9, the three amplifier channels are successively operated. When the various amplifiers are brought into operation, a sudden change in the trace on the recording film will be shown which can be used to indicate the change. Hence, a large range in output signals is recorded on a film of small area. Switches 90 and 91 serve as manual reset means.

The amplifiers are switched on successively according to either an increasing or decreasing level of amplification. The circuits may be designed to measure objects moving toward each other or away from each other. The circuits shown, however, are not automatically reversible and the same circuit may not be used for both movements without modification.

Figure 13:
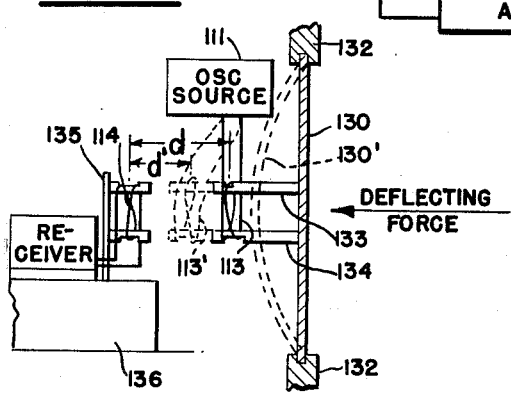
Figure 13 illustrates a simple embodiment of the invention for measurement of instantaneous deflections of a plate.

A simple embodiment of the invention is illustrated in Figure 13, wherein the plate 130 is mounted in blocks as at 132 and has thereon the pillars 133 and 134 on which is secured the one or more turns of the coil 113, energized from oscillatory source 111, such as the generators 17 and 18 of Fig. 5 or other oscillation source. The pick-up coil 114 is shown similarly mounted on a fixed base 136 by supporting structure 135, and electrically connected to the receiver circuit. Any initial separation of the coils 113 and 114 may be designated, and a displaced position of the plate 130 is shown at 130' with a corresponding displaced position of coil 113 at 113', the separation thereof from coil 114 being illustrated at d'. The difference between the distances d and d' is a deflection, and since the device illustrated in Figures 3 and 5 provides an instantaneous measure of this distance at all times, it measures deflections as a very fast acting deflection gauge.

Obviously many modifications and variations of the present invention are possible in the light of the above teachings. It is therefore to be understood, that within the scope of the appended claims, the invention may be practiced otherwise than as specifically described.

What is claimed is:

1. The combination comprising first, second and third amplifier channels having different respective gains; a common input and a common output circuit for said amplifier channels; a control circuit for said amplifier channels comprising: a first, second, third and fourth discharge device each including control, anode and cathode electrodes; a source of direct current energizing voltage for said discharge devices; a first impedance between the anode of said first discharge device and the positive terminal of said source of direct current energizing voltage, and a second impedance between the cathode of said first discharge device and the negative terminal of said energizing voltage source; means coupling the control electrode of said first electron tube discharge device to the said common output circuit of said amplifier channels for rendering said first discharge device conductive when the amplitude of the signal in said common output circuit exceeds a first amplitude level, means coupling the voltage developed across said second impedance to said first amplifier channel to render said first amplifier channel inoperative only upon conduction of said first electron tube discharge device; direct current coupling means for coupling the voltage at the anode electrode of first discharge device to the control electrode of said second discharge device to render the latter said device conductive only when said first discharge device is non-conductive; a third impedance coupled between the cathode electrode of both said second and third electron discharge devices and the negative terminal of said source of energizing voltage; means coupling the anode electrode of said second discharge device to the positive terminal of said source of energizing voltage; a fourth impedance coupled between the anode electrode of said third discharge device and the positive terminal of said source of energizing voltage; means coupling the voltage developed across said third impedance to said second amplifier channel to render same inoperative upon conduction of either said second or third discharge devices; means coupling the control grid of said third discharge device to the said common output of said amplifier channels for rendering said third discharge device conductive when the amplitude of the signal in said common output exceeds a second amplitude level which is higher than said first amplitude level; direct current coupling means for coupling the voltage at the anode electrode of said third discharge device to the control electrode of said fourth discharge device to render the latter said device conductive only when the said third discharge device is non-conductive; a fifth impedance connected in series circuit relation between said cathode of said fourth discharge device and the negative terminal of the source of energizing voltage; and means coupling the voltage developed across said fifth impedance to the said third amplifier channel for rendering same inoperative upon conduction of said fourth discharge device.

2. The combination comprising a first, second and third transmission channels; a first source of control voltage of varying amplitude; control means for rendering said transmissions channels operative in accordance with the amplitude of the voltage from said first control voltage source comprising: a first, second, third and fourth discharge device each including control, anode and cathode electrodes; a source of direct current energizing voltage for said discharge devices; a first impedance between the anode of said first discharge device and the positive terminal of said source of direct current energizing voltage, and a second impedance between the cathode of said first discharge device and the negative terminal of said energizing voltage source; means coupling the control electrodes of said first electron tube discharge device to the said first control voltage source for rendering said first discharge device conductive when the amplitude of said control voltage exceeds a first amplitude level; means coupling the voltage developed across said second impedance to said first transmission channel to render said first transmission channel inoperative only upon conduction of said first electron tube discharge device; direct current coupling means for coupling the voltage at the anode electrode of said first discharge device to the control electrode of said second discharge device to render the latter said device conductive only when said first discharge device is non-conductive; a third impedance coupled between the cathode electrode of both said second and third electron discharge devices and the negative terminal of said source of energizing voltage; means coupling the anode electrode of said second discharge device means to the positive terminal of said source of energizing voltage; a fourth impedance coupled between the anode electrode of said third discharge device and the positive terminal of said source of energizing voltage; means coupling the voltage developed across said third impedance to said second amplifier channel to render same inoperative upon conduction of either said second or third discharge devices; means coupling the control grid of said third discharge device to the said first control voltage source for rendering said third discharge device conductive when the amplitude of said control voltage exceeds a second amplitude level which is higher than said first amplitude level; direct current coupling means for coupling the voltage at the anode electrode of said third discharge device to the control electrode of said fourth discharge device to render the latter said device conductive only when the said third discharge device is non-conductive; a fifth impedance connected in series circuit relation between said fourth discharge device and said source of energizing voltage; means coupling the voltage developed across said fifth impedance to the said third transmission channel for rendering same inoperative upon conduction of said fourth discharge device.

3. The combination comprising a first amplifier channel having a fixed finite predetermined gain, a second amplifier channel having a fixed gain substantially greater than that of said first amplifier channel, first coupling means for coupling a given signal to be amplified simultaneously to the inputs of both of said amplifier channels, second coupling means coupling the output circuits of said amplifier channels to a common output circuit, control means including a gaseous tube discharge device of a type wherein the control grid loses control immediately after the firing thereto and including anode and cathode electrodes, a vacuum tube discharge device including control, cathode and anode electrodes, a source of energizing voltage for said discharge devices, respective impedances in series with said gaseous and vacuum tube discharge devices and said source of energizing voltages, third coupling means including a coupling circuit extending between the control grid of said gaseous tube discharge device and the said common output of said amplifier channels for causing the firing of said gaseous tube discharge device when the amplitude of the signal in said common output exceeds said predetermined range of amplitude values, fourth coupling means coupling the voltage developed across the said impedance in series with said gaseous tube discharge device to one of said amplifier channels to render one of the channels thereof inoperative, means rendering said vacuum tube discharge device conductive during non-conduction of said gaseous tube discharge device and non-conductive during conduction of said gaseous tube discharge device, and fifth coupling means coupling the voltage across said impedance in series with said vacuum tube discharge device to the other one of said amplifier channels to render same inoperative upon conduction of said vacuum tube discharge device.

4. The combination comprising a first amplifier channel having a fixed finite predetermined gain, a second amplifier channel having a fixed gain substantially greater than that of said first amplifier channel, first coupling means for coupling a given signal to be amplified simultaneously to the inputs of both of said amplifier channels, second coupling means coupling the output circuits of said amplifier channels to a common output circuit, control means including first and second electron discharge devices each including anode, cathode and control electrodes, a source of energizing voltage for said discharge devices, respective impedances in series with said first and second electron tube discharge devices and said source of energizing voltage to form respective electronic switch circuits, third coupling means coupling said two electronic switch circuits together so that conduction of one electron tube discharge device results in non-conduction of the other electron tube discharge device, fourth coupling means coupling the said common output of said amplifier channels to the control grid of one of said electron discharge devices for rendering same conductive when the signal in the output of said amplifier exceeds said predetermined range of values, and fifth and sixth coupling means coupling the respective voltages developed across said impedances associated with said first and second electron discharge devices to said respective amplifier channels during conduction thereof for rendering the associated amplifier channel inoperative.

JOHN H. LONG.

References Cited in the file of this patent

UNITED STATES PATENTS

| Number | Name | Date |
|---|---|---|
| 1,711,658 | Sprague | May 7, 1929 |
| 2,253,832 | Whitaker | Aug. 26, 1941 |
| 2,324,314 | Michel | July 13, 1943 |
| 2,396,395 | Smith et al. | Mar. 12, 1946 |
| 2,457,214 | Doll et al. | Dec. 28, 1948 |
| 2,464,353 | Smith et al. | Mar. 15, 1949 |
| 2,482,759 | Goodrich et al. | Sept. 27, 1949 |